United States Patent [19]

Mikuni

[11] Patent Number: 5,059,464
[45] Date of Patent: Oct. 22, 1991

[54] PHENOL RESIN TOOTHED WHEEL AND A METHOD OF PRODUCING THE SAME

[75] Inventor: Mitsuzo Mikuni, Ohtsu, Japan

[73] Assignee: Shin-Kobe Electric Machinery Co., Ltd., Tokyo, Japan

[21] Appl. No.: 492,934

[22] Filed: Mar. 13, 1990

[30] Foreign Application Priority Data

Mar. 16, 1989 [JP] Japan ................................. 1-64135

[51] Int. Cl.$^5$ ............................ B32B 1/04; B32B 3/02
[52] U.S. Cl. ....................................... 428/66; 74/457; 74/462; 74/DIG. 10; 264/140; 264/152; 264/239

[58] Field of Search ............. 428/65, 66; 74/DIG. 10, 74/457, 462; 264/140, 152, 239

[56] References Cited

U.S. PATENT DOCUMENTS 4,458,547  7/1984  Fina .............................. 74/DIG. 10

Primary Examiner—Alexander S. Thomas
Attorney, Agent, or Firm—Pearne, Gordon, McCoy & Granger

[57] ABSTRACT

A phenol resin toothed wheel having a toothed portion formed of meta-aromatic polyamide fiber spun cloth impregnated with phenol resin blended with epoxy resin.

5 Claims, 3 Drawing Sheets

PHENOL RESIN TOOTHED WHEEL AND A METHOD OF PRODUCING THE SAME

BACKGROUND OF THE INVENTION

Resin toothed wheels having a toothed portion formed of resin are generally used because they have low noise when meshed, high abrasion resistance, lightness and low inertia. In order to increase load resistance of the toothed portion of the resin toothed wheel, the resin from which the resin toothed portion is formed is blended with organic or inorganic reinforcing material. It is in the form of grain, fiber or cloth. For example, glass fiber with which resin for the toothed portion is blended serves to improve physical strength and thermal resistance of the toothed portion on the toothed wheel. However, this causes a toothed face of an opponent toothed wheel to be extremely worn down. Thus, such reinfroced resin toothed wheels are not for use in which the toothed wheels are to be charged with much tooth load.

Accordingly, cotton cloth has been generally used as reinforcing material. The cotton cloth is impregnated with phenol resin to form reinforced resin, which is thermally formed in a pressurized manner into moulds. The toothed wheels are produced by cutting the moulds by a gear cutting machine. Such toothed wheels have excellent abrasion resistance and various average properties necessary for the toothed wheels.

However, the phenol resin toothed wheels having the toothed portion formed of phenol resin including cotton cloth as reinforcing material are not suitable in view of characteristics of cotton cloth itself in case that higher physical strength is required. In addition thereto, they are short of durability in case that they are used in lubricating oil having high temperature of 100° through 130° C. as a timing gear for a car engine, for example.

SUMMARY OF THE INVENTION

Accordingly, it is a principal object of the invention to provide a phenol resin toothed wheel having a toothed portion adapted to have abrasion resistance, thermal resistance and durability.

It is another object of the invention to provide a method of producing a phenol resin toothed wheel having a toothed portion adapted to have abrasion resistance, thermal resistance and durability.

It is further object of the invention to provide a method of producing a phenol resin toothed wheel adapted to be produced in an effective manner.

In accordance with one aspect of the present invention, there is provided a phenol resin toothed wheel having a toothed portion formed of mould of phenol resin impregnated with reinforcing material and thermally pressurized, said toothed wheel characterized in that said reinforcing material is meta-aromatic polyamide fiber spun cloth and that said phenol resin is impregnated with epoxy resin.

In accordance with another aspect of the invention, there is provided a method of producing a phenol resin toothed wheel comprising the steps of;
impregnating meta-aromatic polyamide fiber spun cloth with phenol resin blended with epoxy resin;
cutting said meta-aromatic polyamide fiber spun cloth into cloth pieces having a predetermined size after said phenol resin blended with epoxy resin is dried;
rolling up said cloth pieces into rods while they are heated and deforming said rods into rings;
placing said rings together with moulding material for a web and a boss and a bush in a die and thermally forming them in a pressurized manner to produce a moulded part;
and forming teeth by mechanical work on said ring of said moulded part to produce said phenol resin toothed wheel.

BRIEF DESCRIPTION OF THE DRAWINGS

The above and other objects and features of the invention will be apparent from the description of the embodiments of the invention with reference to the accompanying drawings in which.

DESCRIPTION OF THE PREFERRED EMBODIMENTS

Figure 1A:
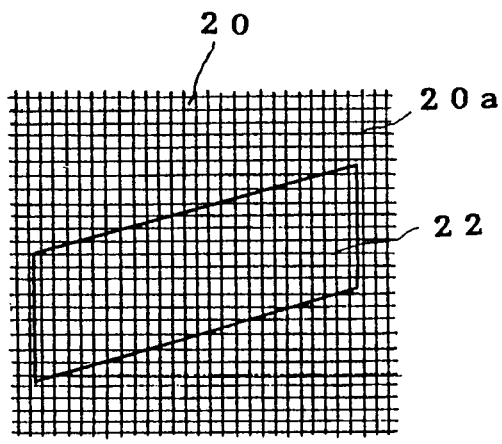
FIG. 1A illustrates a spun cloth used for producing a phenol resin toothed wheel of the invention.
Figure 1B:
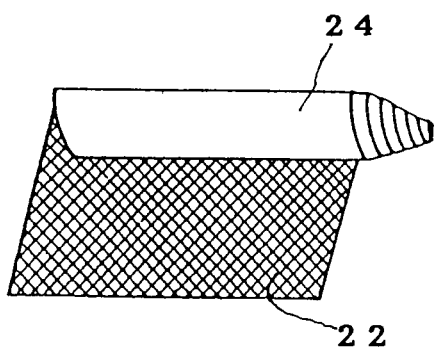
FIG. 1B illustrates one piece of the spun cloth of FIG. 1A being rolled up.
Figure 1C:
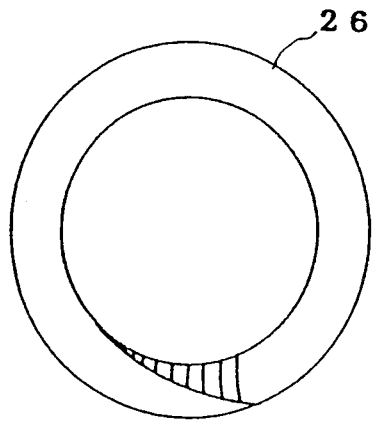
FIG. 1C illustrates the rolled up piece of FIG. 1B being deformed into a ring.
Figure 1D:
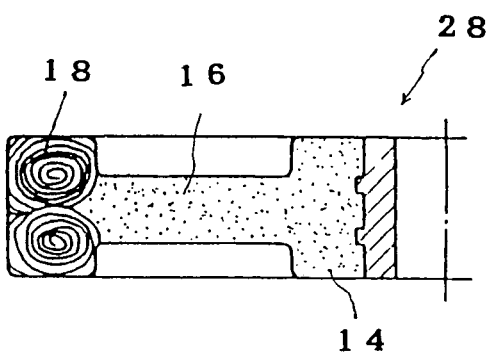
FIG. 1D illustrates in cross sectional view a portion of material for the phenol resin toothed wheel of the invention.
Figure 1E:
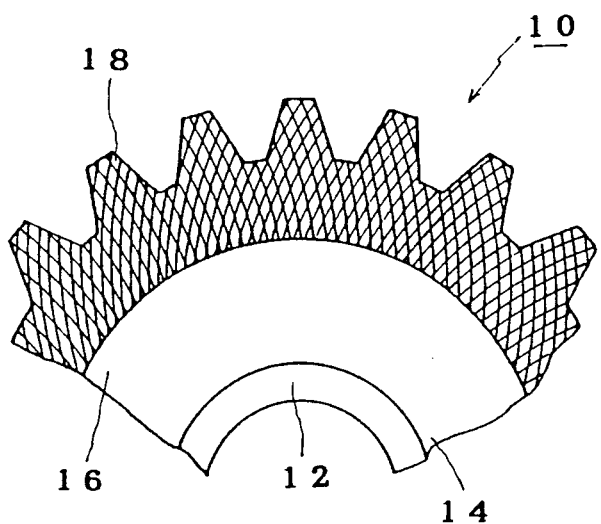
FIG. 1E is a front view of a portion of the phenol resin toothed wheel of the invention.

Referring now to the accompanying drawings, FIGS. 1D and 1E show a phenol resin toothed wheel 10 of the invention. The phenol resin toothed wheel 10 has a bush 12, a boss 14, a web 16 and a toothed portion 18 formed integrally with each other. The toothed portion 18 is moulded of phenol resin impregnated with reinforcing material and thermally pressurized. The reinforcing material is essentially meta-aromatic polyamide fiber spun cloth while the phenol resin is also essentially impregnated with epoxy resin. What the spun cloth means is cloth produced by weaving yarns obtained by twisting fibers of several centimeters length.

The phenol resin toothed wheel of the invention can be basically produced by a method disclosed by Japanese Patent Application Publication No. 29,683/1971. The phenol resin toothed wheel 10 of the invention is produced by the steps of;

(a) impregnating meta-aromatic polyamide fiber spun cloth with phenol resin blended with epoxy resin;

(b) cutting the meta-aromatic polyamide fiber spun cloth into cloth pieces having predetermined size after the phenol resin blended with epoxy resin is dried;

(c) rolling up the cloth pieces into rods while they are heated and deforming the rods into rings;

(d) placing some of the rings together with moulding material for a web and a boss and a bush in a mould and thermally forming them in a pressurized manner to produce a moulded part; and (e) forming teeth by mechanically working the ring on the mould to produce the phenol resin toothed wheel.

Aromatic polyamide fiber is extremely high in its strength, but has not a good characteristic of being bonded with phenol resin with which it is to be impregnated. Aromatic polyamide fiber spun cloth used for the invention has high characteristic of being bonded with synthetic resin because it has a fluffy surface as a characteristic of spun cloth, which causes the strength of bonding the spun cloth with sythetic resin to be improved. Particular combination of meta-aromatic polyamide fiber used for spun cloth and epoxy resin with which the impregnating phenol resin is blended causes chemical strength of bonding the spun cloth with the impregnating resin to be much improved. It should be noted that para-aromatic polyamide fiber cannot fully improve the bonding strength.

In producing the phenol resin toothed wheel of the invention, the piece of meta-aromatic polyamide fiber spun cloth impregnated with phenol resin including epoxy resin, dried and cut is rolled up into the rod and the rolling operation is essentially made while it is being heated. It should be understood that this softens the resin with which the spun cloth is impregnated, which causes the cloth piece to be more easily rolled up so that it can be tightly rolled without any void in the product.

The meta-aromatic polyamide fiber spun cloth is preferably one produced by cutting fibers of 2 through 5 deniers and twisting them so as to become No. 20 yarn of Cotton Yarn Standard or thinner than that of the No. 20 yarn, and weaving the twisted yarns at the densities of 50 through 60 yarns/inch of warp and woof. The fibers themselves preferably have fine longitudinal wrinkles on spinning and elongating them because the longitudinal wrinkles cause physical strength of being bonded with the resin to be higher. The longitudinal wrinkles can be formed by drawing out the molten aromatic polyamide into an atmosphere of air in the form of thread and cooling it while it is elongated.

A blend ratio of epoxy resin with which phenol resin is to be blended is preferably 0.01 through 20 parts per 100 parts of phenol resin by solid weight. An impregnation amount of resin with which the spun cloth is to be impregnated with is preferably 50 through 65 weight %.

EXAMPLE

An elongated spun cloth of polymeta-phenylene isophthal amide fiber commercially available as Conex from Tejin of Japan was used. The fibers had fine longitudinal wrinkles on their face and a thickness of 2 denier. The yarn has a thickness of No. 20 yarn of Cotton Yarn Standard while the cloth has the densities of 55 yarns/inch of warp and of 55 yarns/inch of woof. Resin used was of 100 parts of phenol resin blended with 5 parts of epoxy resin. The polyamide fiber spun cloth was impregnated with the resin having the amount of 55 weight %.

The spun cloth 20 was cut into pieces 22 having a predetermined size as shown in FIG. 1A. The spun cloth 20 was cut so that the piece 22 was in the form of rhomboid having a longitudinal side inclined relative to the warp 20a, but not perpendicular thereto. The piece 22 of rhomboid was placed and heated on a heating panel of 140° C. so that the impregnated resin was softened and thereafter was rolled up about an axis of the longitudinal side of the rhomboid as shown in FIG. 1B so as to form a rod 24. The thus formed rod was deformed into a ring 26 as shown in FIG. 1C. The thus formed ring 26 was a portion which was to form the toothed portion 18.

Thereafter, as shown in FIG. 1D, two rings 24 interposed one on another, moulding material to form the web 16 and the boss 14 and the metal bush 12 were placed in a mould not shown and thermally pressurized to form a moulded part 28. The moulding material for the web and the boss was a composite of cotton cloth piece impregnated with phenol resin and dried and glass fiber woven cloth piece.

The thus produced moulded part 28 was cut by a gear cutting machine, not shown, to form teeth on the moulded rings 18 of the moulded part 28 as shown in FIG. 1E. Since the pieces 22 formed as shown in FIG. 1A were rolled up to form the rod 24 as shown in FIG. 1B, the direction of yarns of the spun cloth corresponded to the direction of stress applied on the tooth root of the toothed wheel as shown in FIG. 1E. Thus, it will be noted that the physical strength of the teeth according to the invention is higher than that in case that teeth were formed on the mould in which the direction of yarns of the spun cloth became concentric and radial by rolling up the piece in the direction of the warp and by deforming it into a ring.

The toothed wheel (OP 10, PA 20 degree and tooth number of 54) constructed in the aforementioned Example was meshed with an opponent toothed wheel of iron of JIS S45C and rotated in lubricating oil of 130° C. The stress applied to the tooth faces of the toothed wheel in this Example relative to the total revolutions thereof is indicated by circular marks 30 in FIG. 2. As noted from FIG. 2, the total revolutions of the toothed wheel was $3 \times 10^8$ in the load condition in which the stress to the toothed face thereof was 16 kg/cm$^2$. It should be noted that the spun cloth may be more fluffy by brushing it after it is spun.

PRIOR ART

Cotton cloth having a thickness of No. 20 yarn of Cotton Yarn Standard and the densities of 55 yarns/inch of warp and of 55 yarns/inch of woof was impregnated with phenol resin not blended with epoxy resin and dried having the resin amount of 55 weight %. A resin toothed wheel was produced using the reinforced resin in the same manner as described in the aforementioned Example.

COMPARISON

Spun cloth of polypara-phenylene terephathal amide fiber commercially available under the name of Kevlar from Dupont having the same thickness and densities as the Example had was impregnated with phenol resin blended with no epoxy resin and dried having the resin amount of 55 weight %. A resin toothed wheel was produced using the reinforced resin in the same manner as described in the aforementioned Example.

Figure 2:
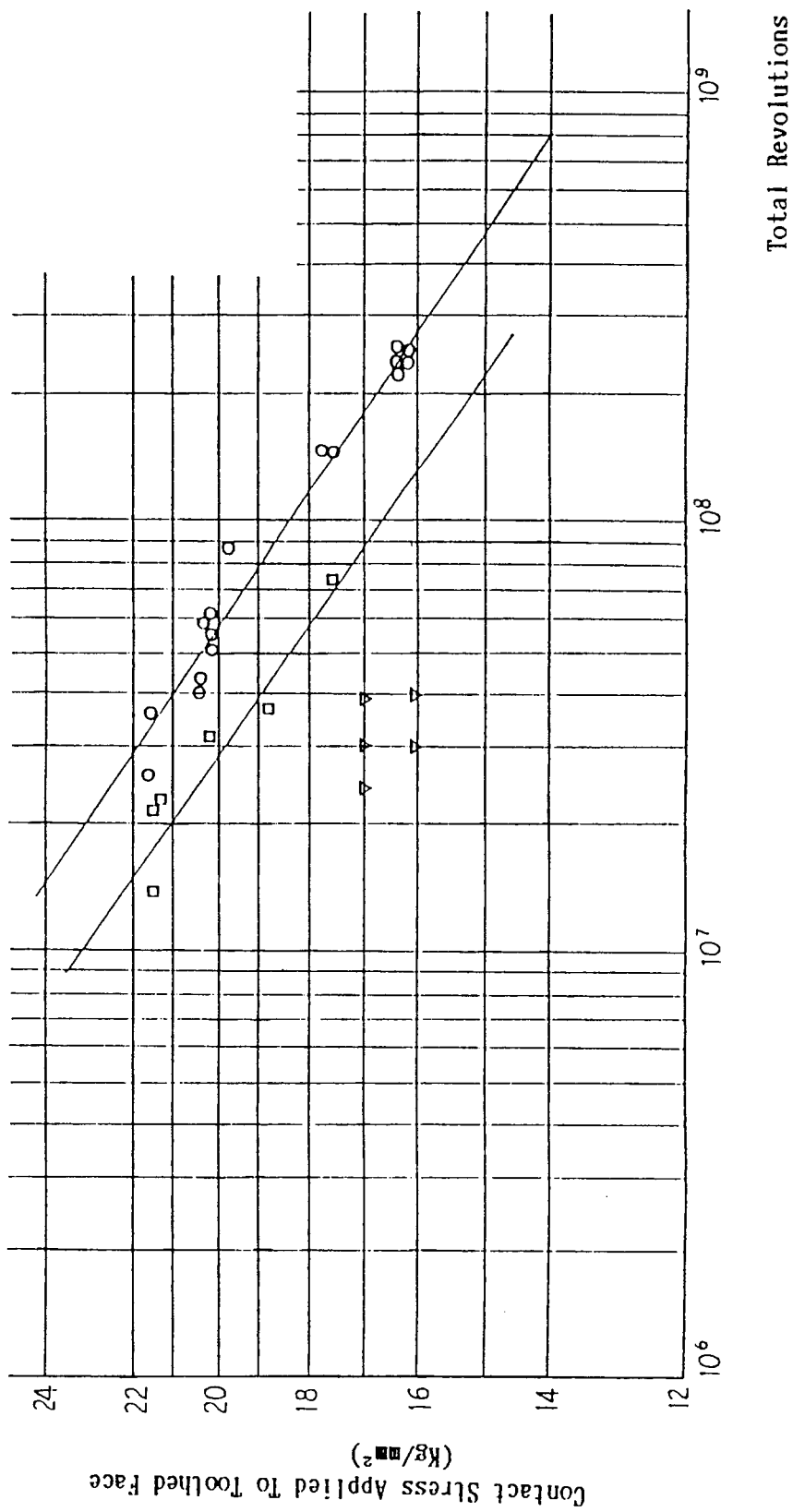
FIG. 2 illustrates contact stress to tooth faces of the toothed wheels of the invention, the prior art and the comparison relative to total revolutions thereof.
Figure 3A:
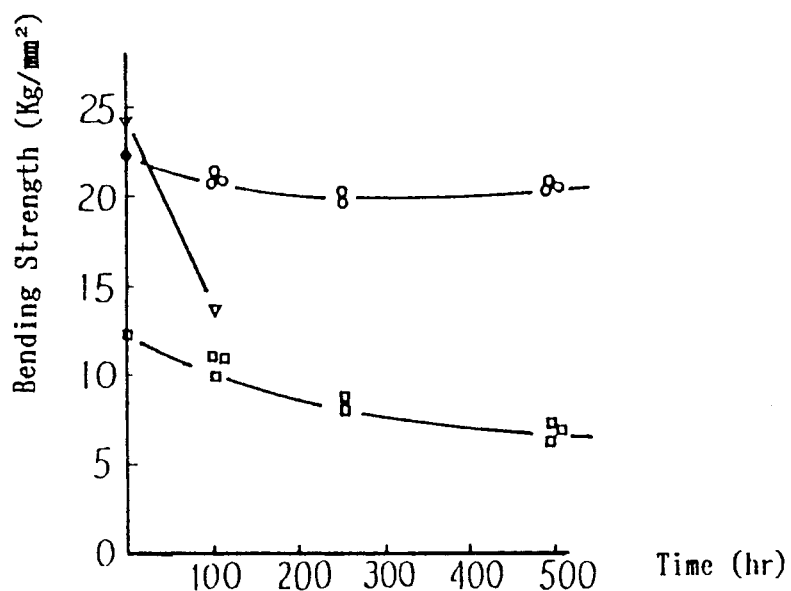
FIG. 3A illustrates bending strength of the toothed wheels of the invention, the prior art and the comparison.
Figure 3B:
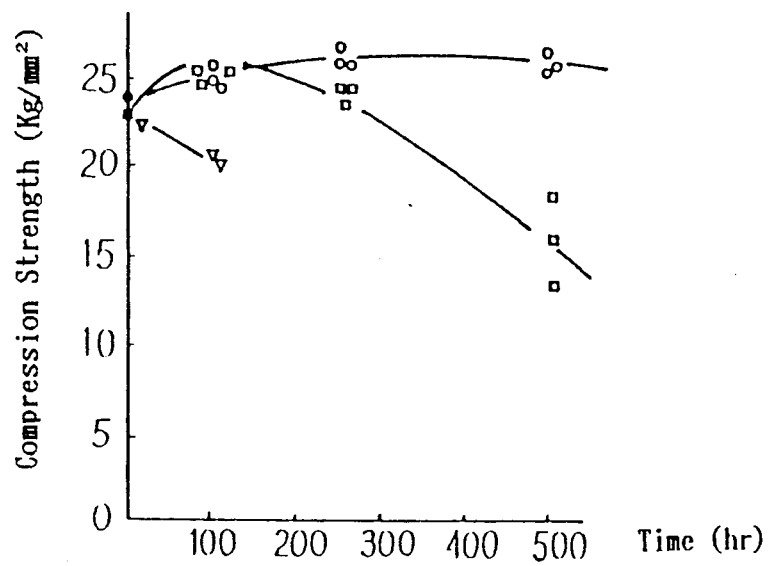
FIG. 3B illustrates compression strength of the toothed wheels of the invention, the prior art and the comparison.

FIG. 2 also shows the characteristic of the toothed wheels of Prior Art and the Comparison, which are indicated by square marks 32 and triangular marks 34, respectively. Also, FIGS. 3A and 3B show variations in bending strength and compression strength when the toothed wheels of the Example, the Prior Art and the Comparison were placed under an air atmosphere of 180° C.

In these figures, circular, square and triangular marks indicate the characteristics of the Example, the Prior Art and the Comparison, respectively. As noted from these figures, the toothed wheel of the Example had more excellent physical strength than those of the Prior Art and the Comparison. Also, it will be noted that the toothed wheel of the Comparison having the spun cloth of para-aromatic polyamide fiber and phenol resin blended with no epoxy resin used had an excellent initial physical strength, but remarkable deterioration under a high temperature atmosphere which varied with time.

Although some embodiments of the invention have been illustrated and described with reference to the accompanying drawings, it will be understood by those skilled in the art that they are by way of examples, and that various changes and modifications may be made without departing from the spirit and scope of the invention, which is intended to be defined only by the appended claims.

What is claimed is;

1. A phenol resin toothed wheel having a toothed portion formed of a moulded part of phenol resin impregnated with reinforcing material and thermally pressurized, said toothed wheel characterized in that said reinforcing material is meta-aromatic polyamide fiber spun cloth and that said phenol resin is impregnated with epoxy resin.

2. A phenol resin toothed wheel as set forth in claim 1, and wherein said meta-aromatic polyamide fiber has longitudinal wrinkles.

3. A method of producing a phenol resin toothed wheel comprising the steps of;
   impregnating meta-aromatic polyamide fiber spun cloth with phenol resin blended with epoxy resin;
   cutting said meta-aromatic polyamide fiber spun cloth into cloth pieces having a predetermined size after said phenol resin blended with epoxy resin is dried;
   rolling up said cloth pieces into rods while they are heated and deforming said rods into rings;
   loading at least one of said rings together with moulding material for a web and a boss and a bush in a mould and thermally forming them in a pressurized manner to produce a moulded part;
   and forming teeth by mechanically working on said ring of said moulded part to produce said phenol resin toothed wheel.

4. A method of producing a phenol resin toothed wheel as set forth in claim 3, and wherein said meta-aromatic polyamide fiber spun cloth is cut so as to form a rhomboid having a longitudinal side inclined relative to the warp of said spun cloth, but not perpendicular thereto.

5. A method of producing a phenol resin toothed wheel as set forth in claim 4, and wherein said cloth pieces of rhomboid are rolled up about an axis of said longitudinal side of said rhomboid.

* * * * *